US010640933B2

(12) United States Patent
Payne et al.

(10) Patent No.: US 10,640,933 B2
(45) Date of Patent: May 5, 2020

(54) MILLING MACHINE HAVING AUTOMATIC GRADE CONTROL SYSTEM

(71) Applicant: Roadtec, Inc., Chattanooga, TN (US)

(72) Inventors: Byron Payne, Chattanooga, TN (US); James H. Bevill, Lookout Moutain, GA (US); Raleigh Harrelson, Tuolumne, CA (US)

(73) Assignee: Roadtec, Inc., Chattanooga, TN (US)

( * ) Notice: Subject to any disclaimer, the term of this patent is extended or adjusted under 35 U.S.C. 154(b) by 22 days.

(21) Appl. No.: 16/136,457

(22) Filed: Sep. 20, 2018

(65) Prior Publication Data
US 2019/0093294 A1 Mar. 28, 2019

Related U.S. Application Data

(60) Provisional application No. 62/561,991, filed on Sep. 22, 2017.

(51) Int. Cl.
*E01C 23/088* (2006.01)
*E01C 23/12* (2006.01)
*B60G 99/00* (2010.01)

(52) U.S. Cl.
CPC .......... *E01C 23/088* (2013.01); *E01C 23/127* (2013.01); *B60G 99/00* (2013.01)

(58) Field of Classification Search
CPC ............................ E01C 23/088; E01C 23/127
See application file for complete search history.

(56) References Cited

U.S. PATENT DOCUMENTS

| 4,139,318 A | * | 2/1979 | Jakob | E01C 23/088 |
| | | | | 172/118 |
| 6,152,648 A | * | 11/2000 | Gfroerer | E01C 23/088 |
| | | | | 299/1.5 |
| 8,113,592 B2 | | 2/2012 | Busley et al. | |
| (Continued) | | | | |

FOREIGN PATENT DOCUMENTS

WO WO 2007/031531 A1 3/2007

OTHER PUBLICATIONS

International Search Report and Written Opinion of counterpart PCT Application No. PCT/US2018/051875 dated Nov. 26, 2018.

*Primary Examiner* — Janine M Kreck
*Assistant Examiner* — Michael A Goodwin
(74) *Attorney, Agent, or Firm* — Chambliss, Bahner & Stophel, P.C.

(57) ABSTRACT

A milling machine includes a milling assembly having a housing to which left and right end gates are attached, a controller, a right front lifting column, a left front lifting column and a rear lifting column. Elevation sensors are located at the front and rear of each of the end gates. The controller is operatively attached to the elevation sensors and to linear actuators within the lifting columns of the milling machine. The elevation sensor that is located at the front end of the right end gate will provide feedback to control the position of the right front lifting column, and the elevation sensor that is located at the front end of the left end gate will provide feedback to control the position of the left front lifting column. The elevation sensors that are located at the rear ends of the end gates are available, as selected by the operator, to provide feedback to control the positions of one of the right and left front lifting columns, as well as the rear lifting column.

6 Claims, 5 Drawing Sheets

(56) References Cited

U.S. PATENT DOCUMENTS

| | | | |
|---|---|---|---|
| 2007/0286678 A1* | 12/2007 | Berning | E01C 23/088 404/90 |
| 2009/0108663 A1 | 4/2009 | Berning et al. | |
| 2010/0109422 A1* | 5/2010 | Busley | B60G 3/01 299/39.6 |
| 2013/0162004 A1* | 6/2013 | Killion | E01C 23/088 299/1.5 |
| 2014/0308075 A1* | 10/2014 | Killion | E01C 23/088 404/84.05 |
| 2014/0333115 A1 | 11/2014 | Berning et al. | |
| 2014/0379227 A1 | 12/2014 | Reuter et al. | |
| 2015/0115689 A1* | 4/2015 | Snoeck | E01C 23/088 299/1.5 |
| 2015/0252539 A1* | 9/2015 | Berning | E01C 23/088 299/1.5 |
| 2017/0362784 A1* | 12/2017 | Hoffmann | E01C 23/088 |

* cited by examiner

MILLING MACHINE HAVING AUTOMATIC GRADE CONTROL SYSTEM

CROSS-REFERENCE TO RELATED APPLICATION

This application claims the benefit of U.S. Provisional Patent Application No. 62/561,991 which was filed on Sep. 22, 2017.

FIELD OF THE INVENTION

This invention relates generally to a milling machine having a system for adjusting the height of the lifting columns of a milling machine during operation. More specifically, the invention comprises a system for automatically setting the vertical positions of all of the lifting columns in order to provide accurate grade control of the surface being milled.

BACKGROUND AND DESCRIPTION OF THE PRIOR ART

Roadway repair is often accomplished by overlaying the existing pavement (whether of concrete or asphalt paving material) with a new layer (often called a leveling course) of concrete or asphalt paving material. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth to be filled across the width) as in the undamaged areas. The resulting reduced thickness in the overlay of the previously damaged areas will lead to renewed rutting or other wear damage in the new pavement in relatively short order. However, by milling the surface of the damaged pavement to a uniform surface elevation below the level of the damage, the addition of new pavement will produce a road surface having a consistent elevation across the entire width of the roadway. This repaving technique can be used to return the elevation of a damaged roadway to its original pre-damaged elevation, whereas the placement of a leveling course atop damaged but un-milled pavement will tend to raise the surface of the roadway or some portion thereof above its original elevation. Roadway repair without milling can require the raising of road shoulders, guardrails and manhole covers and the adjustment of overpass clearances, all of which is unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine typically comprises a wheeled or track-driven vehicle that includes a milling drum having a plurality of cutting teeth around its periphery, which milling drum is mounted for rotation about a substantially-horizontal axis within a drum housing on the frame of the machine. Steerable wheel-drive or track-drive assemblies operated by hydraulic motors are provided to drive the machine in a processing direction and to steer it along a desired milling path. The drive assemblies are attached to lifting columns that include internal linear actuators which can be activated to raise and lower the frame of the machine with respect to the roadway surface. Wheel-drive machines include four wheel-drive assemblies, one at the left front, one at the right front, one at the left rear and one at the right rear. Track-drive machines include three or four track-drive assemblies including one at the left front and one at the right front. Some such machines will also include a third track-drive assembly at the left rear and a fourth at the right rear; however, some track-drive machines will have only a single, center-mounted rear drive assembly.

Since the milling drum is mounted in a housing on the frame of the machine, raising the frame on the lifting columns can raise the milling drum out of contact with the roadway surface, and lowering the frame on the lifting columns can lower the milling drum into contact with the road surface so as to make a cut of the desired depth. The milling drum is rotated by a primary drum drive assembly typically comprising a drive belt driven by a diesel engine, which drive belt engages a sheave on an input drive shaft for the cutter drum. A gear box is typically located between the sheave and the milling drum and includes a gear train and an output drive shaft on which the milling drum is rotated. The gear box thus allows for rotation of the output drive shaft for the milling drum at a speed and torque that is different from that of the input drive shaft. Generally, the milling machine also includes a conveyor system that is designed to carry the milled material that has been cut from the roadway by the rotating milling drum to a location in front of, to the rear of, or beside the machine for deposit into a truck for removal from the milling site. Power for operation of the hydraulic motors that are typically employed to operate the conveyors and the drive assemblies is usually provided by the diesel engine.

A road stabilizer is similar to a milling machine in that it comprises a wheeled or track-driven vehicle that includes a rotating milling drum on which are mounted a plurality of cutting teeth, which drum is rotated by a primary drum drive assembly typically comprising a belt drive that engages a sheave on an input drive shaft for the cutter drum. A gear box is typically located between the sheave and the milling drum and includes a gear train and an output drive shaft on which the milling drum is rotated. The gear box thus allows for rotation of the output drive shaft for the milling drum at a speed and torque that is different from that of the input drive shaft. The wheel-drive or track-drive assemblies of the road stabilizer are mounted on lifting columns that include internal linear actuators which can be activated to raise and lower the frame of the machine with respect to the roadway surface. However, the milling drum of a road stabilizer is generally employed to mill or pulverized an existing road bed or roadway to a greater depth than does a milling machine prior to repaving (usually called reclaiming) or prior to initial paving (usually called stabilizing), and it leaves the pulverized material in place. The pulverized material left behind is usually compacted and covered with one or more additional layers of crushed aggregate material before paving.

Because the milling drums and the lifting columns of a milling machine and of a road stabilizer operate in the same way for purposes of this invention, the term "milling machine" will be used hereinafter as a generic term for both types of machines.

The milling drum of a milling machine is partially enclosed in a drum housing that prevents material being milled from the surface from being ejected away from the machine, at least partially controls the dust produced in the milling operation, and also protects against inadvertent access to the rotating milling drum. Conventional milling machines include end gates on opposite sides of this housing that float to the level of the roadway or other surface being milled when the milling drum is set to provide the desired cut depth. Thus, the end gates travel along the uncut surface of the roadway outside the path cut by the milling drum. However, conditions on the roadway may change as the milling machine progresses in milling the surface. Thus, the operator is constantly monitoring the positioning of the milling drum in order to maintain the desired cut.

It is known to use sensors mounted on the frame of a milling machine to allow an operator to control the extension of the front lifting columns; however, the rear lifting columns are manually adjusted by the machine operator without sensor input at the beginning of the milling process and when changes are required during the milling process. It would be desirable if an automatic system could be developed for automatically controlling the extension of the lifting columns throughout the milling process in order to control the elevation of the milling drum during a milling operation.

ADVANTAGES OF A PREFERRED EMBODIMENT OF THE INVENTION

Among the advantages of a preferred embodiment of the invention is that provides a system for automatically controlling the extension of the lifting columns of a milling machine in order to control the elevation of the milling drum during a milling operation. Additional objects and advantages of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise described herein either specifically or as indicated by context. The terms "operatively attached" and "operatively connected" are such attachments, couplings or connections that allow the pertinent structures to operate as intended by virtue of that relationship. The term "fluid communication" is such an attachment, coupling or connection that allows for flow of fluid from one such structure or component to or by means of the other.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "milling machine" refers to a vehicle having a milling drum that is adapted to be rotated so as to cut into the surface on which the vehicle is operated, and includes machines typically called milling machines, cold planers, road stabilizers and road reclaimers.

The term "processing direction" refers to the primary direction of travel of a milling machine as it operates on a roadway.

The terms "front", "forward" and similar terms, when used with respect to a milling machine or a component of such a machine, refer to a relative location or direction towards the leading end of the milling machine as it travels in the processing direction.

The terms "rear", "behind" and similar terms, when used with respect to a milling machine or a component of such a machine, refer to a relative location or direction towards the trailing end of the milling machine as it travels in the processing direction.

The terms "upper", "top", "above" and similar terms, when used in reference to a relative position or direction on or with respect to a milling machine, or a component or portion of such a machine, refer to a relative position or direction that is farther away from the surface on which the milling machine is placed for operation.

The terms "lower", "bottom", "below" and similar terms, when used in reference to a relative position or direction on or with respect to a milling machine, or a component or portion of such a machine, refer to a relative position or direction that is nearer to the surface on which the milling machine is placed for operation.

The term "left", as used herein to describe a direction or relative position of a milling machine or an assembly, component or portion of such a machine, refers to a position or orientation towards the left, from the perspective of the operator who is driving the machine in the processing direction.

The term "right", as used herein to describe a direction or relative position of a milling machine or an assembly, component or portion of such a machine, refers to a position or orientation towards the right, from the perspective of the operator who is driving the machine in the processing direction.

The terms "linear actuator" and "actuator" refer to an electric, pneumatic, hydraulic, electro-hydraulic or mechanical device that generates force which is directed in a straight line. One common example of a "linear actuator" is a hydraulic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder.

The terms "linear actuator/sensor" and "actuator/sensor" refer to a linear actuator with an associated position sensor such as an internal linear displacement transducer or an external linear displacement transducer that is adapted to measure the extension of the rod of the actuator and to transmit a signal indicative of the rod extension to a controller or computer processor to which the actuator/sensor is operatively attached.

The term "elevation sensor" may refer to the position sensor of an actuator/sensor that is used to adjust the elevation of an end gate and/or to a separate sensor that is adapted to measure the elevation or vertical position of a milling machine end gate, the extension of a linear actuator in a lifting column or the elevation of the frame with respect to a lifting column. An "elevation sensor" may be associated with a linear actuator that is used to adjust the elevation of the end gate or the frame on the lifting column.

SUMMARY OF THE INVENTION

The invention comprises a system for automatically controlling the elevation of the milling drum of a milling machine as it is being operated to mill a roadway. The milling machine includes a housing for the milling drum. Left and right end gates are attached to the housing and are adapted for substantially-vertical movement with respect to the housing. The milling machine includes a controller and four elevation sensors that are associated with the left and right end gates. Preferably, a first elevation sensor is located at the front end of the left end gate, and a second is located at the front end of the right end gate. A third elevation sensor is located at the rear end of the left end gate, and a fourth elevation sensor is located at the rear end of the right end gate. The controller is operatively attached to the four elevation sensors and to the linear actuators within the front and rear lifting columns of the milling machine.

The elevation sensor that is located at the front end of the right end gate will provide feedback to control the position of the right front lifting column, and the elevation sensor that is located at the front end of the left end gate will provide feedback to control the position of the left front lifting column. The elevation sensors that are located at the rear ends of the end gates are available, as selected by the operator, to provide feedback to control the positions of one of the right and left front lifting columns, as well as both of the right and left rear lifting columns, if the machine is provided with two rear lifting columns (because the linear actuators in the two lifting columns are on the same hydraulic circuit so that they work together) or the centrally located rear lifting column, if the machine is provided with only one rear lifting column.

The operator will set a desired cut depth, and the controller will actuate the lifting columns to position the milling drum with respect to the roadway to establish the desired cut depth. The right and left end gates will float down to rest on the roadway surface under the influence of gravity. The operator will also select the right side or the left side of the milling machine, preferably depending on which end gate (right or left) is on more stable ground, and will communicate this selection to the controller. In the preferred embodiment of the invention, the controller will average the measured elevations of both the front and rear end gate elevation sensors on the side that is not selected by the operator (i.e., on the side that is preferably on less stable ground) and will use this information to provide continuous control of the linear actuator in the front lifting column on the un-selected side to insure that the milling drum remains in position to obtain the desired cut depth. The controller will also use the measured elevation obtained from the front end gate elevation sensor on the selected side to provide continuous control of the linear actuator in the front lifting column on the selected side to insure that the milling drum remains in position to obtain the desired cut depth. In addition, the controller will use the measured elevation obtained from the rear end gate elevation sensor on the selected side to provide continuous control of the linear actuator in the rear lifting column (or the linear actuators in the left rear and right rear lifting columns) to insure that the milling drum remains in position to obtain the desired cut depth.

By utilizing the instantaneous elevation measurements from the end gate elevation sensors and the known configuration and location of the milling drum with respect to the housing, the controller can automatically make the necessary adjustments in the elevations of the front and rear lifting columns to account for any elevation changes in the surface being milled in order to maintain the desired cut depth throughout the milling process.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
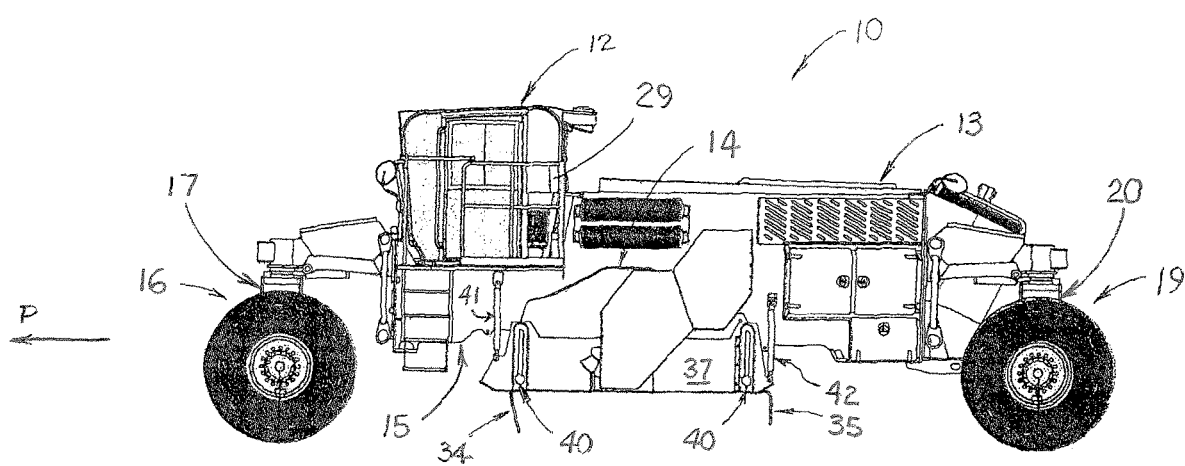
FIG. 1 is side view of a first embodiment of a milling machine which includes the invention.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, milling machine 10 comprises a road stabilizer that includes operator's station 12, and engine compartment 13 which encloses a conventional power source such as a diesel engine (not shown). Operator's station 12 includes all of the controls necessary for driving and steering the milling machine in processing direction "P", operating the milling drum (not shown, but contained within drum housing 14), and controlling certain aspects of the invention, as explained hereinafter. Power from the engine is transmitted by a drive belt or other means known to those having ordinary skill in the art to the milling drum. The milling drum is of conventional design and includes a plurality of cutter teeth that are disposed around its periphery, which cutter teeth are adapted to mill the roadway surface as the milling drum rotates and the machine is advanced along the roadway in the processing direction. The bottom of the milling cut path coincides with the lower portion of the circular cutter tooth path inscribed by the plurality of cutter teeth as the milling drum rotates. Linear actuators are provided to raise and lower frame 15 carrying drum housing 14 and the milling drum with respect to the roadway on which the machine is operated. Preferably, the lifting columns to which the wheel assemblies are attached include internal linear actuators that extend and retract to change the elevation of the machine frame carrying the milling drum with respect to the roadway on which the machine is being operated. Thus, left front wheel assembly 16 is attached to left front lifting column 17 which includes internal elevation actuator 18 (shown in FIG. 3). A right front wheel assembly (not shown, but substantially similar to left front wheel assembly 16) is located opposite left front wheel assembly 16 on a right front lifting column that is substantially similar to left front lifting column 17. Similarly, left rear wheel assembly 19 is attached to left rear lifting column 20 which includes an internal elevation actuator (not shown, but substantially similar to actuator 18). A right rear wheel assembly (not shown, but substantially similar to left rear wheel assembly 19) is located opposite left rear wheel assembly 19 on a right rear lifting column that is substantially similar to left rear lifting column 20. Propulsive power from the engine is also transmitted by means known to those having ordinary skill in the art to which the invention relates to the wheel assemblies, some or all of which are steerable.

Figure 3:
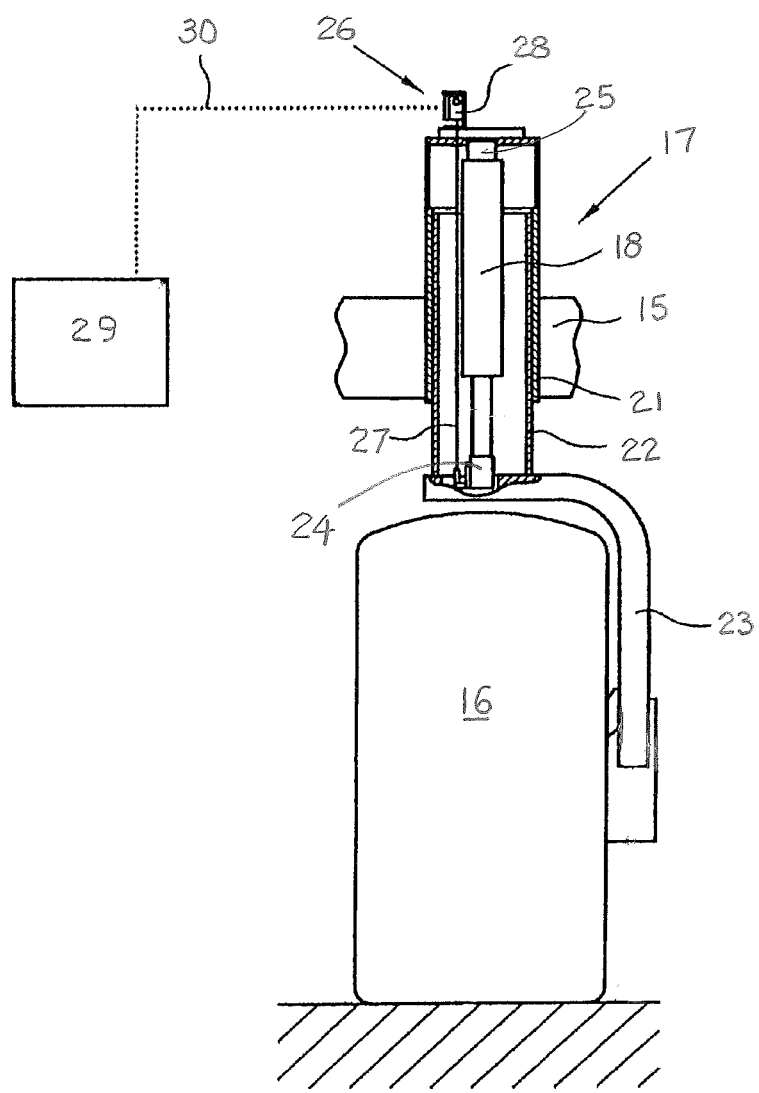
FIG. 3 is a front view, partly in section, of a lifting column of the milling machine shown in FIGS. 1 and 2.

Referring now to FIG. 3, lifting column 17 comprises two hollow cylinders 21 and 22 which are capable of telescoping movement with respect to each other. Lifting column 17 thus serves to guide and control a portion of the height adjustment of machine frame 15 and the milling drum with respect to the surface of the roadway. Upper outer cylinder 21 is attached to frame 15, and lower inner cylinder 22 is attached to support 23 for wheel 16. Located within lifting column 17 is a linear actuator comprising internal elevation actuator 18, which may be operated to adjust the elevation of machine frame 15 and the milling drum with respect to the roadway. In the embodiment shown in FIG. 3, rod end 24 of linear actuator 18 is attached at support 23, and cylinder end 25 is attached to upper outer cylinder 21 which is attached to frame 15.

Lifting column 17 includes or is associated with elevation sensor 26 for measuring the instantaneous lifting state of lifting column 17. In the embodiment shown in FIG. 3, elevation sensor 26 comprises a wire rope sensor that includes wire rope 27 and sensor head 28. Wire rope 27 is attached at its lower end to the bottom of lower inner cylinder 22 or to support 23 for wheel 16, and at its upper end to sensor head 28, which is attached to the upper end of upper outer cylinder 21. The measured path signal of the wire rope sensor is transmitted by sensor head 28 to controller 29 by means of signal transmission line 30.

Figure 2:
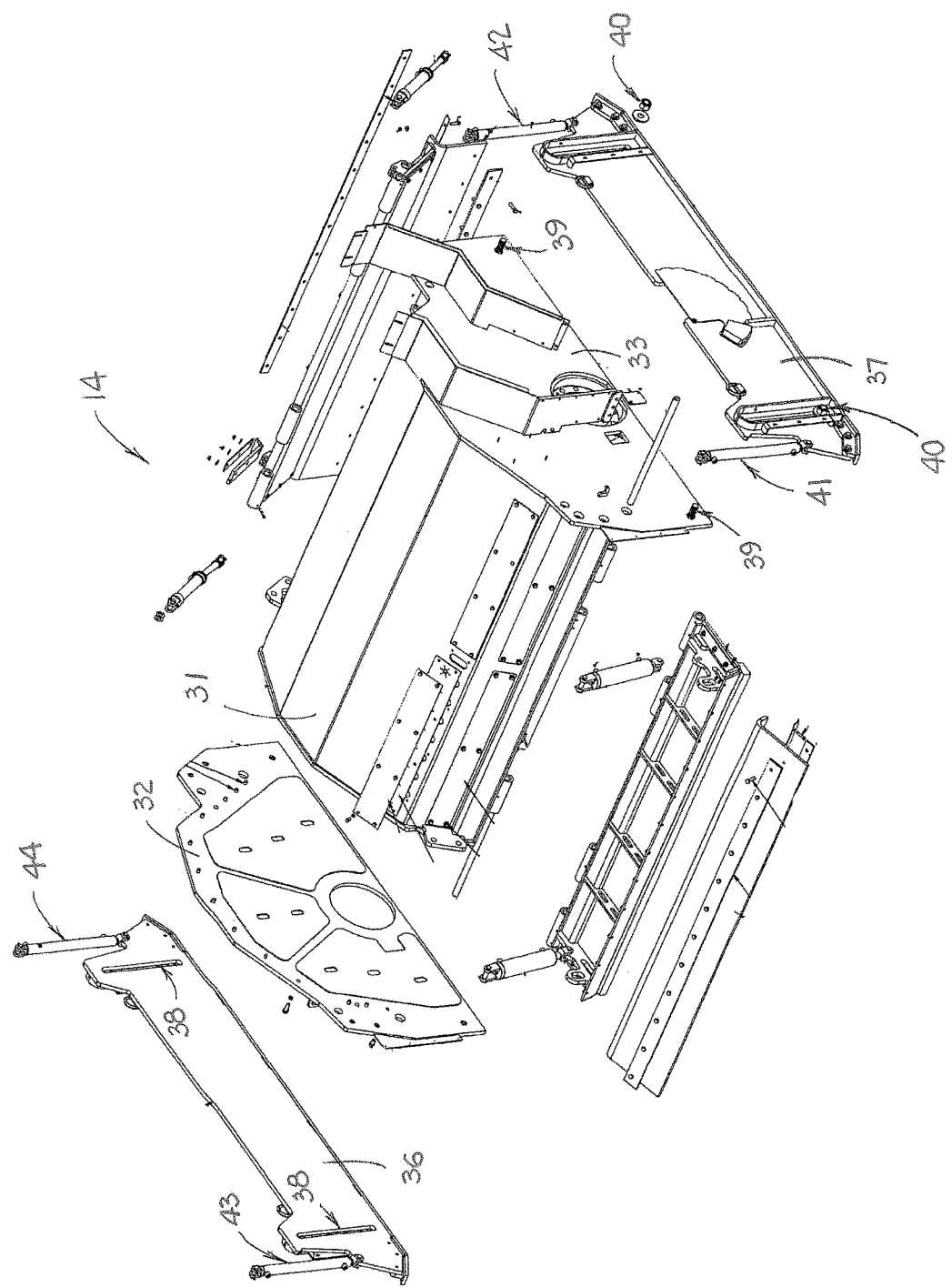
FIG. 2 is an exploded view of the drum housing assembly of the milling machine shown in FIG. 1.
Figure 5:
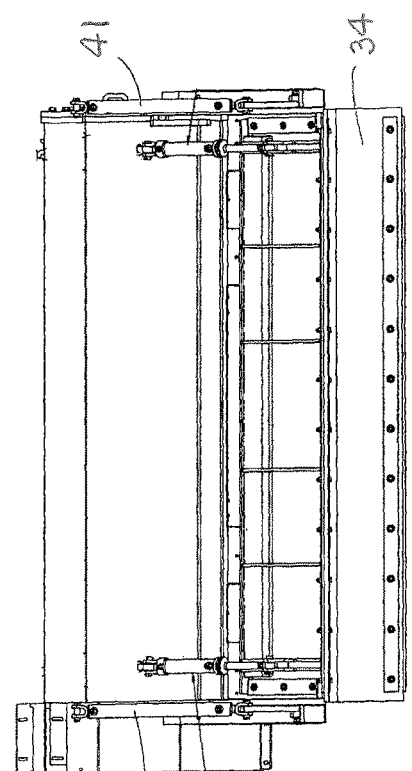
FIG. 5 is an end view of the drum housing assembly shown in FIGS. 2 and 4.
Figure 4:
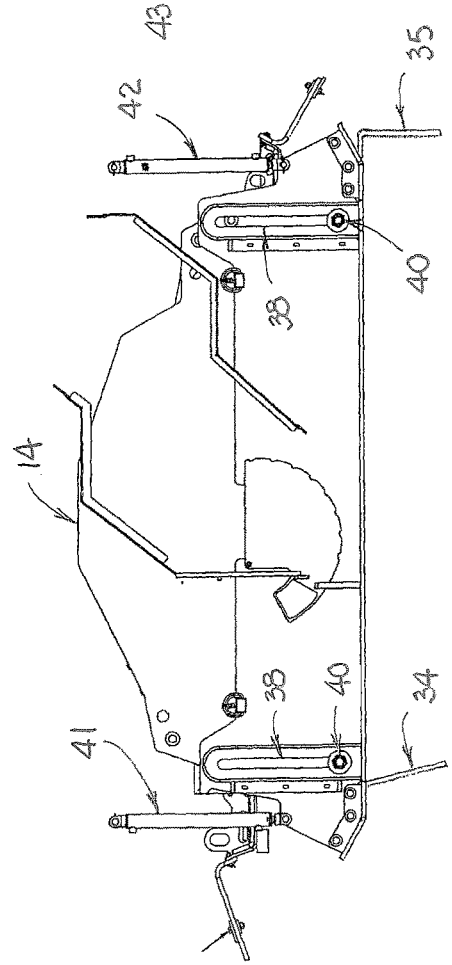
FIG. 4 is a side view of the drum housing assembly shown in FIG. 2.

Referring now to FIGS. 2, 4 and 5, drum housing 14 includes top enclosure 31 and a pair of side enclosures, right side enclosure 32 and left side enclosure 33. These enclosures generally enclose the milling drum and prevent the uncontrolled ejection of the milled material therefrom. Drum housing 14 also has front flexible extension 34 and rear flexible extension 35 that contact the road surface and provide a seal against the escape of dust when maintained against the road surface. Attached to the outer side of right side enclosure 32 is right end gate 36, and attached to the outer side of left side enclosure 33 is left end gate 37. Each of the end gates has a pair of guide slots 38 that are engaged by guide bolts 39 on the side enclosures to provide a measure of control for the vertical adjustment of the elevation of the end gates. Nuts 40 are attached to the ends of bolts 39 to limit the movement of the end gates to substantially vertical movement. Also attached to each end of each of the end gates is a linear actuator. Each linear actuator is associated with or includes a position sensor preferably comprising an internal linear displacement transducer or an external linear displacement transducer that measures the extension of the rod of the actuator to determine the vertical position of the front or rear of each end gate. Thus, left front actuator/sensor 41 is attached between frame 15 of machine 10 and the front end of left end gate 37. Left rear actuator/sensor 42 is attached between the frame of the machine and the rear end of left end gate 37. Similarly, right front actuator/sensor 43 is attached between the frame of the machine and the front end of right end gate 36, and right rear actuator/sensor 44 is attached between the frame of the machine and the rear end of right end gate 36. In other embodiments of the invention (not shown), the linear actuators and position sensors attached to the front and rear of each end gate may be separate units that are operatively attached to controller 29.

Actuators/sensors 41, 42, 43 and 44, and the linear actuators in left front lifting column 17, the right front lifting column, left rear lifting column 20 and the right rear lifting column are all operatively attached to controller 29, which is located in operator's station 12. Each of the linear actuators is in fluid communication with a hydraulic circuit including a hydraulic pump that is operatively connected to controller 29. In addition, elevation sensor 26 in left front lifting column 17, and similar elevation sensors in the right front lifting column, left rear lifting column 20 and the right rear lifting column are also operatively attached to controller 29. Each elevation sensor is adapted to transmit a signal to the controller that is indicative of the relative elevation of the lifting column or portion of the end gate with which it is associated, and the controller is adapted to use this information to control the extension of the linear actuators in the lifting columns.

Controller 29 may embody a single microprocessor or multiple microprocessors that include components for controlling the operations of milling machine 10 based on input from an operator of the milling machine and on sensed or other known operational parameters. Controller 29 is preferably programmed with information about the various relative positions, configurations and dimensions of the end gates, the milling drum, and the lifting columns so that it can determine the specific adjustments in the elevations of the lifting columns that are required to maintain the desired cut depth. Controller 29 includes or is associated with a memory, and it will preferably include a data input component such as a touch screen and/or a plurality of actuating buttons for receiving input from an operator of the milling machine. Controller 29 may also include a data output component such as a display screen, a secondary storage device, a processor and other components for running an application. Various circuits may be associated with and operatively connected to the controller, such as power supply circuitry and hydraulic circuitry. Numerous commercially available microprocessors can be configured to perform the functions of controller 29. It should be appreciated that the controller could readily be embodied in a general purpose computer or machine microprocessor capable of controlling numerous milling machine functions.

As described above, controller 29 is operatively attached to left front actuator/sensor 41, left rear actuator/sensor 42, right front actuator/sensor 43 and right rear actuator/sensor 44. Controller 29 is adapted to receive signals indicative of the elevation of the left end gate with respect to the roadway surface from left front actuator/sensor 41 and left rear actuator/sensor 42, and controller 29 is also adapted to receive signals indicative of the elevation of the right end gate with respect to the roadway surface from right front actuator/sensor 43 and right rear actuator/sensor 44.

Controller 29 is also operatively attached to left front linear actuator 18 of the left front lifting column 17 and left front elevation sensor 26 that is associated with left front lifting column 17. Controller 29 is adapted to receive a signal indicative of the elevation of the frame with respect to the roadway surface from elevation sensor 26 and is adapted to control the movement of left front linear actuator 18 in left front lifting column 17 with respect to the roadway surface. Similarly, controller 29 is operatively attached to the right front linear actuator of the right front lifting column and to a right front elevation sensor that is associated with the right front lifting column. Controller 29 is adapted to receive a signal indicative of the elevation of the frame with respect to the roadway surface from the right front elevation sensor and is adapted to control the movement of the right front linear actuator in the right front lifting column with respect to the roadway surface. Controller 29 is also operatively attached to the left rear linear actuator of left rear lifting column 20 and to a left rear elevation sensor that is associated with left rear lifting column 20. Controller 29 is adapted to receive a signal indicative of the elevation of the frame with respect to the roadway surface from the left rear elevation sensor and is adapted to control the movement of left rear linear actuator in left rear lifting column 20 with respect to the roadway surface. Similarly, controller 29 is operatively attached to the right rear linear actuator of the right rear lifting column and to a right rear elevation sensor that is associated with the right rear lifting column. Controller 29 is adapted to receive a signal indicative of the elevation of the frame with respect to the roadway surface from the right rear elevation sensor and is adapted to control the movement of the right rear linear actuator in the right rear lifting column with respect to the roadway surface.

Left front actuator/sensor 41 will transmit a signal to controller 29 that is indicative of the elevation of the front end of the left end gate with respect to the roadway surface, and controller 29 is adapted to control the elevational position of left front lifting column 17, at least in part in response to such signal. Similarly, right front actuator/sensor 43 will transmit a signal to controller 29 that is indicative of the elevation of the front end of the right end gate with respect to the roadway surface, and controller 29 is adapted to control the elevational position of the right front lifting column, at least in part in response to such signal. The actuators/sensors that are located at the rear ends of the end gates are adapted to transmit signals to controller 29 to allow the controller to control the elevational positions of one of the left front lifting column and the right front lifting column according to the invention, as well as the left rear lifting column 20 and the right rear lifting column (because the internal linear actuators in the two lifting columns are on the same hydraulic circuit so that they work together).

To begin the automatic control process described herein, the operator will select a desired cut depth and communicate this selection to controller 29. The controller will then actuate the linear actuators in the lifting columns to locate the milling drum with respect to the roadway so as to obtain the desired cut depth, thereby allowing right end gate 36 and left end gate 37 to settle onto the surface of the roadway. The operator will also select right rear elevation sensor 44 or left rear elevation sensor 42, preferably depending on which end gate (right or left) is on more stable ground. The operator will cause these settings and selections to be communicated to controller 29. Thereafter, the controller will control the linear actuator in the front lifting column on the side that is not selected by the operator by averaging the measured elevation of both the front and rear end gate elevation sensors on the un-selected side and using this information to control the linear actuator in the front lifting column on the un-selected side to insure that the milling drum remains in position to obtain the desired cut depth. The controller will also independently control the linear actuator in the front lifting column on the selected side by using the measurement from the front end gate elevation sensor on the selected side to insure that the milling drum remains in position to obtain the desired cut depth. In addition, the controller will use the measured elevation obtained from the rear end gate elevation sensor on the selected side, either right rear elevation sensor 44 or left rear elevation sensor 42, to provide continuous control of the linear actuators in the left rear and right rear lifting columns to insure that the milling drum remains in position to obtain the desired cut depth.

Figure 6:
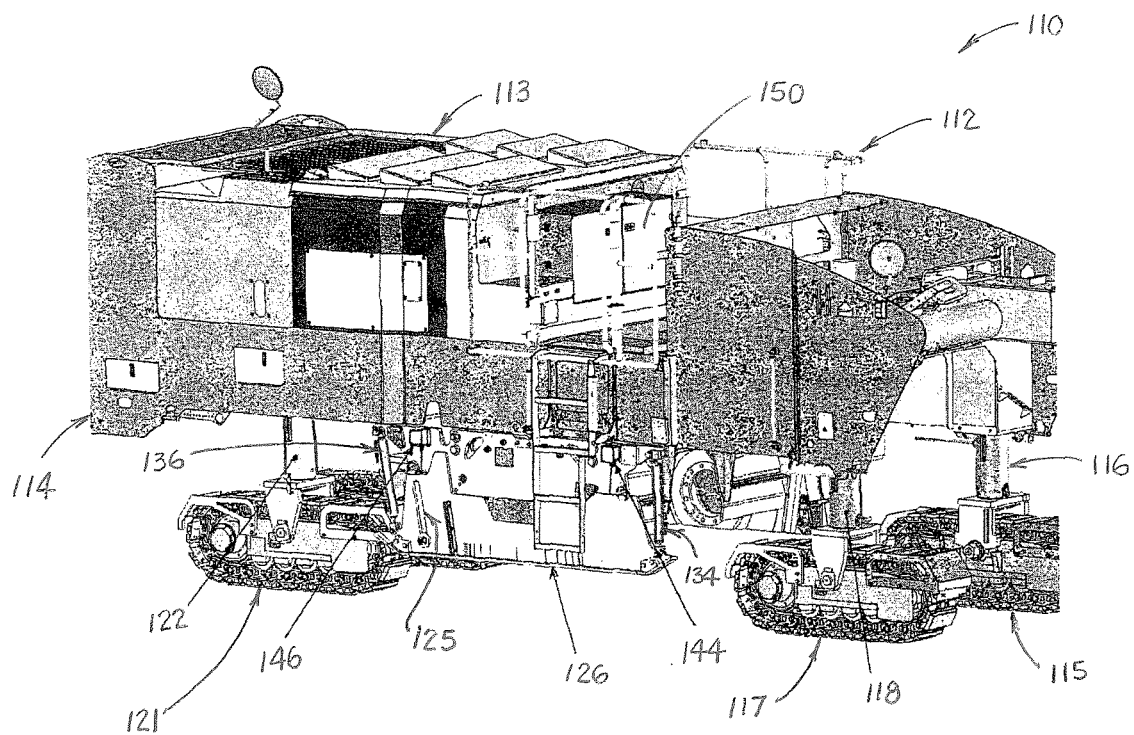
FIG. 6 is a right side perspective view of a second embodiment of a milling machine which includes the invention.
Figure 7:
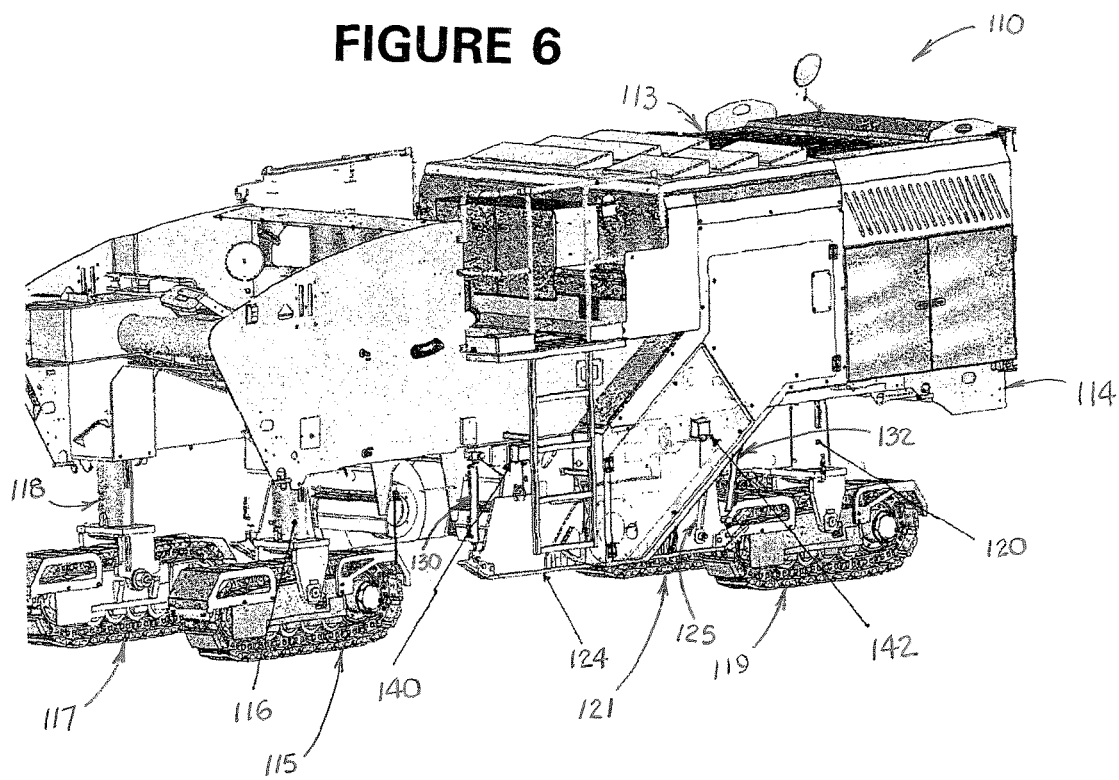
FIG. 7 is a left side perspective view of the milling machine shown in FIG. 6.

A second embodiment of the invention is shown in FIGS. 6 and 7. As shown therein, milling machine 110 is a track-driven machine that includes operator's station 112 and engine compartment 113 which encloses a power source such as a diesel engine. Operator's station 112 includes all of the controls necessary for driving and steering the milling machine, operating the milling drum (not shown), and controlling certain aspects of the invention. Power from the engine is transmitted by a drive belt or other means known to those having ordinary skill in the art to the milling drum. The milling drum includes a plurality of cutter teeth that are disposed around its periphery and are adapted to mill the roadway surface as the milling drum rotates and the machine is advanced along the roadway. Linear actuators are provided to raise and lower frame 114 carrying the drum housing and the milling drum with respect to the roadway on which the machine is operated. Preferably, a linear actuator such as elevation actuator 18 is internally contained within each of the lifting columns to which the track-drive assemblies are attached. These actuators are adapted to extend and retract to change the elevation of the machine frame carrying the milling drum with respect to the roadway on which the machine is being operated. Thus, left front track-drive assembly 115 is attached to left front lifting column 116 which includes an internal linear actuator (not shown, but substantially similar to linear actuator 18 of milling machine 10). Right front track-drive assembly 117 is attached to right front lifting column 118 which also includes an internal linear actuator (not shown). Similarly, left rear track-drive assembly 119 is attached to left rear lifting column 120 which includes an internal linear actuator (not shown), and right rear track-drive assembly 121 is attached to right rear lifting column 122 which also includes an internal linear actuator (also not shown). Propulsive power from the engine is also transmitted by means known to those having ordinary skill in the art to which the invention relates to the track-drive assemblies, some or all of which are steerable.

Left end gate 124 is attached to the outside of the left side enclosure of the drum housing, and right end gate 126 is attached to the outside of the right side enclosure of the drum housing. Left end gate 124 is substantially similar to left end gate 37 of milling machine 10, and right end gate 126 is substantially similar to right end gate 36 of milling machine 10. The end gates have guide slots 125 that are substantially similar to guide slots 38 of milling machine 10, which provide a measure of control for the vertical positioning of the end gates.

Also attached to each of the end gates are a pair of actuators that are adapted to raise and lower the end gates with respect to the drum housing. Thus, left front actuator 130 is attached between the frame of milling machine 110 and the front end of left end gate 124, and left rear actuator 132 is attached between the frame of the milling machine and the rear end of left end gate 124. Similarly, right front actuator 134 is attached between the frame of milling machine 110 and the front end of right end gate 126, and right rear actuator 136 is attached between the frame of the milling machine and the rear end of right end gate 126.

In addition, a pair of ground-engaging sensors are attached to each end gate. In the embodiment of the invention illustrated in FIGS. 6 and 7, these sensors are wire-rope sensors that extend to indicate the distance to the ground when the end gate to which they are attached is in contact with the ground, but any known sensors may be employed that are capable of determining the height of the end gates with which they are associated relative to the ground. As shown in the drawings, left front ground-engaging sensor 140 is attached between the frame of milling machine 110 and the front end of left end gate 124, and left rear ground-engaging sensor 142 is attached between the frame of the milling machine and the rear end of left end gate 124. Similarly, right front ground-engaging sensor 144 is attached between the frame of milling machine 110 and the front end of right end gate 126, and right rear ground-engaging sensor 146 is attached between the frame of the milling machine and the rear end of right end gate 126.

Sensors 140, 142, 144 and 146, and the linear actuators in left front lifting column 116, right front lifting column 118, left rear lifting column 120 and right rear lifting column 122 are operatively attached to controller 150. Elevation sensors (not shown but substantially similar to elevation sensor 26 of milling machine 10) that are associated with left front lifting column 116, right front lifting column 118, left rear lifting column 120 and right rear lifting column 122 are also operatively attached to controller 150, which is located in operator's station 112. Controller 150 is substantially similar to controller 29 of milling machine 10.

The operator will select a desired cut depth and will communicate this selection to controller 150. The controller will actuate the linear actuators in the lifting columns to locate the milling drum with respect to the roadway so as to obtain the desired cut depth. This will allow left end gate 124 and right end gate 126 to settle onto the surface of the roadway. Left front sensor 140 will provide feedback to control the position of left front lifting column 116 with respect to frame 114, and right front sensor 144 will provide feedback to control the position of right front lifting column 118 with respect to the frame. Left rear sensor 142 and right rear sensor 146 will provide feedback to control the elevation of either left front lifting column or right front lifting column, as well as the elevations of left rear lifting column 120 and right rear lifting column 122 with respect to the frame (because the linear actuators in the two lifting columns are on the same hydraulic circuit so that they work together). The operator will select left rear sensor 142 or right rear sensor 146, preferably depending on which end gate (left or right) is on more stable ground.

Controller 150 is adapted to determine an actual left front cut depth on the left side of the milling machine using the left front end gate signal, an actual left rear cut depth on the left side of the milling machine using the left rear end gate signal, an actual right front cut depth on the right side of the milling machine using the right front end gate signal, and an actual right rear cut depth on the right side of the milling machine using the right rear end gate signal. Controller 150 is also adapted to control the linear actuator in the front lifting column on the side that is not selected by the operator by averaging the actual front cut depth and the actual rear cut depth on the unselected side of the machine and using this average to adjust the elevation of the front lifting column on the un-selected side to maintain the desired cut depth. Thus, using the selection by the operator of left rear sensor 142 or right rear sensor 146, controller 150 will control the linear actuator in the front lifting column on the side that is not selected by the operator by using the signals received from the front and rear end gate sensors on the un-selected side to determine the measured cut depths at the front and rear of the end gate on the un-selected side. Controller 150 will then average these measured cut depths on the un-selected side and use this information to control the linear actuator in the front lifting column on the un-selected side to position the milling drum to maintain the desired cut depth.

Controller 150 will also independently control the front lifting column on the selected side by positioning the front lifting column with respect to the frame such that the measurement from the front end gate sensor on the selected side corresponds to the elevation of the lifting column required to maintain the desired cut depth. In addition, controller 150 will use the measured elevation obtained from the rear end gate elevation sensor on the selected side, either right rear elevation sensor 146 or left rear elevation sensor 142, to provide continuous control of the linear actuators in the left rear and right rear lifting columns to insure that the milling drum remains in position to obtain the desired cut depth.

Although this description contains many specifics, these should not be construed as limiting the scope of the invention but as merely providing an illustration of the presently preferred embodiments thereof, as well as the best mode contemplated by the inventors of carrying out the invention. The invention, as described herein, is susceptible to various modifications and adaptations as would be appreciated by those having ordinary skill in the art to which the invention relates.

What is claimed is:

1. A milling machine for milling a roadway surface as operated by an operator, said milling machine comprising:
 (a) a frame;
 (b) a milling assembly comprising a drum housing having a right side and a left side and being attached to the frame, said milling assembly including:
  (i) a right end gate having a front end and a rear end and being attached to the right side of the housing, said right end gate being adapted to be moved vertically with respect to the housing;
  (ii) a right front elevation sensor that is attached to the right end gate and is adapted to determine an elevation of the front end of the right end gate with respect to the frame of the milling machine;

(iii) a right rear elevation sensor that is attached to the right end gate and is adapted to determine an elevation of the rear end of the right end gate with respect to the frame of the milling machine;

(iv) a left end gate having a front end and a rear end and being attached to the left side of the housing, said left end gate being adapted to be moved vertically with respect to the housing;

(v) a left front elevation sensor that is attached to the left end gate and is adapted to determine an elevation of the front end of the left end gate with respect to the frame of the milling machine;

(vi) a left rear elevation sensor that is attached to the left end gate and is adapted to determine an elevation of the rear end of the left end gate with respect to the frame of the milling machine;

(c) a right front lifting column that is attached at its upper end to the frame and at its lower end to a right front drive assembly, said right front lifting column including a right front linear actuator which can be operated to raise and lower the frame of the machine with respect to the roadway surface;

(d) a left front lifting column that is attached at its upper end to the frame and at its lower end to a left front drive assembly, said left front lifting column including a left front linear actuator which can be operated to raise and lower the frame with respect to the roadway surface;

(e) a rear lifting column that is attached at its upper end to the frame and at its lower end to a rear drive assembly, said rear lifting column including a rear linear actuator which can be operated to raise and lower the frame of the machine with respect to the roadway surface;

(f) a controller that is:
  (i) operatively attached to the right front elevation sensor and is adapted to receive a right front end gate signal indicative of the elevation of the front end of the right end gate with respect to the roadway surface;
  (ii) operatively attached to the right rear elevation sensor and is adapted to receive a right rear end gate signal indicative of the elevation of the rear end of the right end gate with respect to the roadway surface;
  (iii) operatively attached to the left front elevation sensor and is adapted to receive a left front end gate signal indicative of the elevation of the front end of the left end gate with respect to the roadway surface;
  (iv) operatively attached to the left rear elevation sensor and is adapted to receive a left rear end gate signal indicative of the elevation of the rear end of the left end gate with respect to the roadway surface;
  (v) operatively attached to the right front linear actuator of the right front lifting column and is adapted to control the elevation of the right front lifting column with respect to the roadway surface;
  (vi) operatively attached to the left front linear actuator of the left front lifting column and is adapted to control the elevation of the left front lifting column with respect to the roadway surface;
  (vii) adapted to receive a side selection signal from the operator selecting either the left side or the right side of the milling machine;
  (viii) adapted to receive a cut depth signal from the operator selecting a desired cut depth;
  (ix) adapted to determine an actual right front cut depth on the right side of the milling machine using the right front end gate signal;
  (x) adapted to determine an actual right rear cut depth on the right side of the milling machine using the right rear end gate signal;
  (xi) adapted to determine an actual left front cut depth on the left side of the milling machine using the left front end gate signal;
  (xii) adapted to determine an actual left rear cut depth on the left side of the milling machine using the left rear end gate signal;
  (xiii) adapted to control the linear actuator in the front lifting column on the side that is not selected by the operator by averaging the actual front cut depth and the actual rear cut depth on the un-selected side of the machine and using this average to adjust the elevation of the front lifting column on the un-selected side to maintain the desired cut depth;
  (xiv) adapted to control the linear actuator in the front lifting column on the selected side by using the actual front cut depth of the selected side of the machine to adjust the elevation of the front lifting column on the selected side to maintain the desired cut depth.

2. The milling machine of claim 1:
(a) which includes:
  (i) a right front elevation sensor that is associated with the right front lifting column and is adapted to determine a right front elevation of the frame with respect to the roadway surface;
  (ii) a left front elevation sensor that is associated with the left front lifting column and is adapted to determine a left front elevation of the frame with respect to the roadway surface;
(b) wherein the controller is:
  (i) operatively attached to the right front elevation sensor of the right front lifting column and is adapted to receive a right front lifting column signal indicative of the right front elevation of the frame with respect to the roadway surface;
  (ii) operatively attached to the left front elevation sensor of the left front lifting column and is adapted to receive a left front lifting column signal indicative of the left front elevation of the frame with respect to the roadway surface.

3. The milling machine of claim 1 wherein:
(a) the housing comprises:
  (i) a left side enclosure having an outer side to which a pair of left side guide bolts are attached;
  (ii) a right side enclosure having an outer side to which a pair of right side guide bolts are attached;
(b) the left end gate includes a pair of left side guide slots that are engaged by the left side guide bolts to provide a measure of control for vertical adjustment of the elevation of the left end gate;
(c) a nut is attached to the ends of each of the left side guide bolts to limit the movement of the left end gate to substantially vertical movement;
(d) the right end gate includes a pair of right side guide slots that are engaged by the right side guide bolts to provide a measure of control for vertical adjustment of the elevation of the right end gate;
(e) a nut is attached to the ends of each of the right side guide bolts to limit the movement of the right end gate to substantially vertical movement.

4. The milling machine of claim 1 wherein the controller is:
(a) operatively attached to the rear linear actuator of the rear lifting column and is adapted to control the elevation of the rear lifting column with respect to the roadway surface;
(b) adapted to control the linear actuator in the rear lifting column by using the actual rear cut depth of the selected side of the machine to adjust the elevation of the rear lifting column to maintain the desired cut depth.

5. The milling machine of claim 4:
(a) which includes a rear elevation sensor that is associated with the rear lifting column and is adapted to determine the rear elevation of the frame with respect to the roadway surface;
(b) wherein the controller is operatively attached to the rear elevation sensor of the rear lifting column and is adapted to receive a rear lifting column signal indicative of the elevation of the frame with respect to the roadway surface.

6. A method for operating a milling machine comprising:
(a) a frame;
(b) a milling assembly comprising a drum housing having a right side and a left side and being attached to the frame, said housing including:
  (i) a right end gate having a front end and a rear end and being attached to the right side of the housing, said right end gate being adapted to be moved vertically with respect to the housing;
  (ii) a right front elevation sensor that is attached to the right end gate and is adapted to determine an elevation of the front end of the right end gate with respect to the frame of the milling machine;
  (iii) a right rear elevation sensor that is attached to the right end gate and is adapted to determine an elevation of the rear end of the right end gate with respect to the frame of the milling machine;
  (iv) a left end gate having a front end and a rear end and being attached to the left side of the housing, said left end gate being adapted to be moved vertically with respect to the housing;
  (v) a left front elevation sensor that is attached to the left end gate and is adapted to determine an elevation of the front end of the left end gate with respect to the frame of the milling machine;
  (vi) a left rear elevation sensor that is attached to the left end gate and is adapted to determine an elevation of the rear end of the left end gate with respect to the frame of the milling machine;
(c) a right front lifting column that is attached at its upper end to the frame and at its lower end to a right front drive assembly, said right front lifting column including a right front linear actuator which can be operated to raise and lower the frame of the machine with respect to the roadway surface;
(d) a left front lifting column that is attached at its upper end to the frame and at its lower end to a left front drive assembly, said left front lifting column including a left front linear actuator which can be operated to raise and lower the frame with respect to the roadway surface;
(e) a rear lifting column that is attached at its upper end to the frame and at its lower end to a rear drive assembly, said rear lifting column including a rear linear actuator which can be operated to raise and lower the frame of the machine with respect to the roadway surface;
(f) a controller that is:
  (i) operatively attached to the right front elevation sensor and is adapted to receive a right front end gate signal indicative of the elevation of the front end of the right end gate with respect to the roadway surface;
  (ii) operatively attached to the right rear elevation sensor and is adapted to receive a right rear end gate signal indicative of the elevation of the rear end of the right end gate with respect to the roadway surface;
  (iii) operatively attached to the left front elevation sensor and is adapted to receive a left front end gate signal indicative of the elevation of the front end of the left end gate with respect to the roadway surface;
  (iv) operatively attached to the left rear elevation sensor and is adapted to receive a left rear end gate signal indicative of the elevation of the rear end of the left end gate with respect to the roadway surface;
  (v) operatively attached to the right front linear actuator of the right front lifting column and is adapted to control the elevation of the right front lifting column with respect to the roadway surface;
  (vi) operatively attached to the left front linear actuator of the left front lifting column and is adapted to control the elevation of the left front lifting column with respect to the roadway surface;
  (vii) operatively attached to the rear linear actuator of the rear lifting column and is adapted to control the elevation of the rear lifting column with respect to the roadway surface;
  (viii) adapted to receive a side selection signal from the operator selecting either the left side or the right side of the milling machine;
  (ix) adapted to receive a cut depth signal from the operator selecting a desired cut depth;
  (x) adapted to determine an actual right front cut depth on the right side of the milling machine using the right front end gate signal;
  (xi) adapted to determine an actual right rear cut depth on the right side of the milling machine using the right rear end gate signal;
  (xii) adapted to determine an actual left front cut depth on the left side of the milling machine using the left front end gate signal;
  (xiii) adapted to determine an actual left rear cut depth on the left side of the milling machine using the left rear end gate signal;
  (xiv) adapted to control the linear actuator in the front lifting column on the side that is not selected by the operator by averaging the actual front cut depth and the actual rear cut depth on the un-selected side of the machine and using this average to adjust the elevation of the front lifting column on the un-selected side to maintain the desired cut depth;
  (xv) adapted to control the linear actuator in the front lifting column on the selected side by using the actual front cut depth of the selected side of the machine to adjust the elevation of the front lifting column on the selected side to maintain the desired cut depth;
  (xvi) adapted to control the linear actuator in the rear lifting column by using the actual rear cut depth of the selected side of the machine to adjust the elevation of the rear lifting column to maintain the desired cut depth;

said method comprising:
(g) selecting a desired cut depth and communicating the desired cut depth to the controller;
(h) selecting either the right side of the milling machine or the left side of the milling machine;
(i) operating the controller to control the linear actuator in the front lifting column on the side that is not selected by the operator by averaging the actual front cut depth and the actual rear cut depth on the un-selected side of the machine and using this average to adjust the elevation of the front lifting column on the un-selected side to maintain the desired cut depth;
(j) operating the controller to control the linear actuator in the front lifting column on the selected side by using the actual front cut depth of the selected side of the machine to adjust the elevation of the front lifting column on the selected side to maintain the desired cut depth;
(k) operating the controller to control the linear actuator in the rear lifting column by using the actual rear cut depth of the selected side of the machine to adjust the elevation of the rear lifting column to maintain the desired cut depth.

* * * * *